Figure 1:
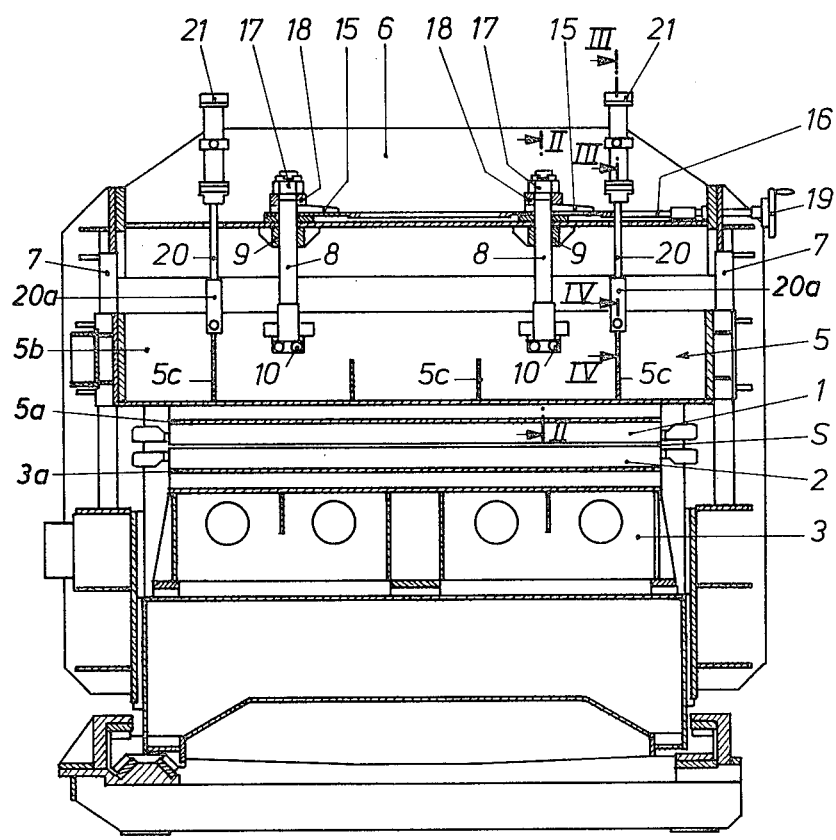

United States Patent [19]

Kaster et al.

[11] 4,304,346
[45] Dec. 8, 1981

[54] STRIP-WITHDRAWAL DEVICE FOR METAL RIBBONS TO BE WOUND

[75] Inventors: Hans Kaster, Ratingen-Hösel; Klaus Bösenberg, Meerbusch, both of Fed. Rep. of Germany

[73] Assignee: Walzmaschinenfabrik August Schmitz GmbH, Düsseldorf, Fed. Rep. of Germany

[21] Appl. No.: 68,575

[22] Filed: Aug. 22, 1979

[30] Foreign Application Priority Data

Aug. 24, 1978 [DE] Fed. Rep. of Germany ....... 2836934

[51] Int. Cl.³ ............................................. B65H 17/42
[52] U.S. Cl. ....................................... 226/119; 72/183
[58] Field of Search .......................... 226/88, 119, 195; 242/75, 75.2; 72/183

[56] References Cited

U.S. PATENT DOCUMENTS 3,380,686  4/1968  Gaudin ............................. 242/75.2

Primary Examiner—Leonard D. Christian
Attorney, Agent, or Firm—John J. Dennemeyer

[57] ABSTRACT

A strip-withdrawal device for producing back tension in a plurality of metal ribbons to be wound, with at least one travelling-wave linear motor for producing the back tension, the linear motor being subject to preliminary bending against the bending forces occurring during operation, which preliminary bending is desired during operation, so that the gap between the linear motor and the plane of the strip remains of equal size over the width and thus also the braking forces acting on each ribbon.

11 Claims, 5 Drawing Figures

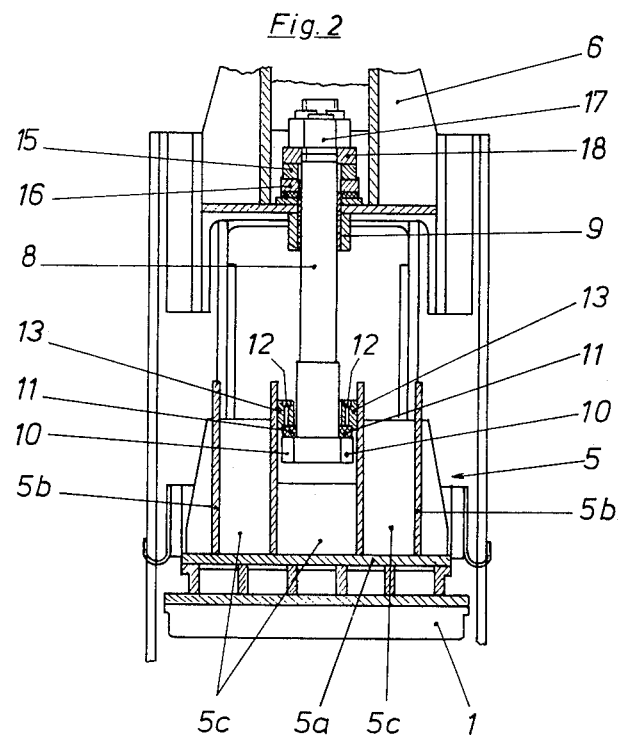
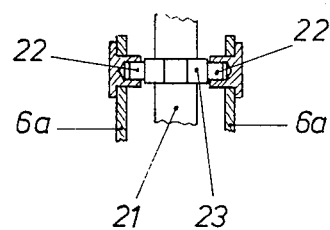 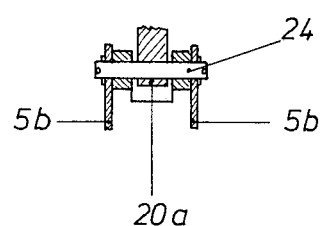

STRIP-WITHDRAWAL DEVICE FOR METAL RIBBONS TO BE WOUND

The invention relates to a strip-withdrawal device for producing back tension in a plurality of metal ribbons to be wound, using two travelling-wave linear motors. It is thus based on the device described in German Offenlegungsschrift No. 22 46 558, for producing a predetermined braking force on winding devices for metal strips. The use of at least one travelling-wave linear motor for producing a braking force in ribbons travelling side-by-side has the advantage that despite the varying length of the ribbons leaving the strip shears, each ribbon is held taut at the time of winding, owing to the back tension of the linear motor, so that it is possible to wind good narrow strip connections. However, if very wide linear motors must be used when ribbons are cut from a very wide cold rolled strip, then it has a disadvantageous effect that the components of the travelling magnetic forces acting at right-angles to the direction of the back tension cause a deflection of the linear motor to the effect that in the region of the central ribbons, a smaller air gap exists between the linear motor and the ribbon than at the edges. Consequently, the central ribbons may come into contact with the comb of the linear motor, which may give rise to disturbances. Furthermore, the back tension decreasing from the center towards the edges may have the effect that adjacent strips travel one above the other within the linear motor and thereafter.

The object of the invention is to provide a strip-withdrawal device for metal ribbons to be wound, of the afore-described type, in which it is ensured that during the operation, even wide linear motors operate with a constant air gap over their width with respect to the ribbons, i.e. the deflection caused by the operation is eliminated. This object is fulfilled by a device for the preliminary bending of at least the upper linear motor into a concave contour, which, seen in the direction of the strip, has a greater distance at the center from the plane of the travelling metal strips, than at the edges, the contour being pre-set depending on the components of the travelling magnetic forces acting at right-angles to the direction of the back tension so that during the operation of the apparatus, it approaches a straight line. It is thus recommended that the preliminary bending device can be controlled depending on the current consumption of the linear motor or motors, in which case the preliminary bending is pre-set if necessary from empirical values, depending on the thickness of the ribbon. It is also conceivable to provide measuring devices which ascertain deflections of the comb of a linear motor from the straight line to be achieved, in order to supply fault signals to an automatic control device for keeping the straight line or the air gap to be achieved, constant.

In rolling mills, the so-called crown dimension control device is well-known, with which, due to counter-bending of working or support rollers, the deflection brought about by the operation, of the rollers under the rolling force is compensated for, in order to obtain sheets with an equal tolerance of thickness over the entire thickness. However, in the case of rolling technology, one can start from the fact that the working rolls are supported over their length on the material to be rolled, so that it is relatively simple to provide counter-bending of the rollers by bending forces acting on extended roll journals. On the other hand, a linear motor must retain an air gap with respect to the material on which it is intended to exert back tension or a propelling force. With this pre-requisite, special solutions are required for the preliminary bending of a linear motor within the framework of a strip-withdrawal device according to the invention, which solutions are not provided by the control device for the crown dimension in rolling mills.

Figure 5:
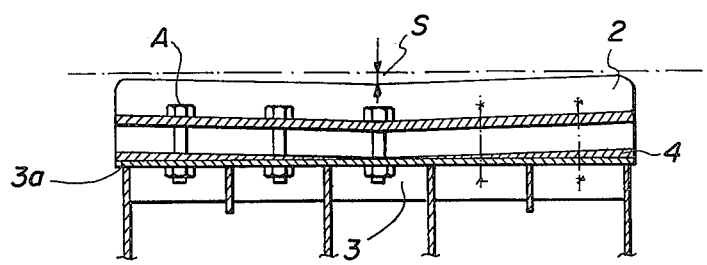

One embodiment of the invention is illustrated in the drawings and in particular FIG. 1 is a vertical section at right-angles to the direction of travel of the ribbons, FIG. 2 is a section on line II—II of FIG. 1, FIG. 3 is a section on line III—III of FIG. 1, FIG. 4 is a section on line IV—IV of FIG. 1 and FIG. 5 shows a shim according to the present invention.

The strip-withdrawal device comprises two travelling-wave linear motors 1 and 2, which form an air gap S therebetween for the passage of the ribbons to be slowed down, which air gap is to be kept constant as far as possible as regards its depth, over its entire length, since the linear motors have the tendency to deflect and approach at the center, under the components of the magnetic forces acting at right-angles to the back tension. Due to this, not only does the back tension vary in strips, but on the other hand, the central ribbons may touch the linear motors and be stopped.

In the embodiment, no special preliminary bending device is provided for the lower linear motor 2, since it is possible to insert a lower cross bar 3 which is very resistant to bending, for this linear motor, to the support wall 3a of which cross member the linear motor 2 can be connected by screws A in a flat and tension-proof manner as illustrated by FIG. 5, so that the linear motor and cross member act as a common support which is resistant to bending. Moreover, a certain fundamental bend can be imparted to the linear motor 2 due to the fact that a shim 4 according to FIG. 5 is inserted between the linear motor 2 and the support wall 3a. Under the tension of the fixing screws A, owing to the double wedge-shaped cross section of the shim 4, the linear motor 3 experiences downwards bending, i.e. with respect to the air gap S, it obtains a concave contour as a preliminary bend, which disappears and should approach a straight line as far as possible, when the device is operating. It is also possible to insert a shim between the upper linear motor 1 and the support wall 5a of a transverse beam 5, whereby solely due to a pre-set invariable preliminary bending of both linear motors 1 and 2, the deflection of the linear motors occurring during operation, under the vertical components of the magnetic forces, can be largely eliminated, especially since the shims 4 can be exchanged for shims having a different cross section, if, when thinner ribbons pass therethrough, for reasons of saving energy, the linear motors are operated with less energy and their deflection due to operation becomes less. The use of shims 4 is one of the concrete solutions according to the invention. However, in the embodiment, a controllable preliminary bending device is provided for the upper linear motor 1—if necessary in addition to a shim 4. As already mentioned, for this purpose, the upper linear motor 1 is connected in a flat and tension-proof manner by screws, in a manner similar to that illustrated by FIG. 5 to the support wall 5a of a transverse beam 5. The transverse beam 5 is reinforced by intersecting cross bars 5b and 5c (FIG. 2). It is suspended from an upper transverse member 6 which is resistant to bending and is guided in a vertically adjustable manner on vertical posts 7, by which the upper cross member 6 is combined with the lower cross member 3 to form a machine frame.

The suspension of the linear motor 1 consists of an inner pair of symmetrical tie-rods 8 at right-angles to the direction in which the strip travels, which tie-rods are guided in a straight line in sleeves 9 of the cross member 6. On account of the possibility of deflection of the transverse beam 5, the lower ends of the tie-rods 8 are flexibly connected to the transverse beam 5, in that as shown most clearly in FIG. 2, the tie-rods support rollers 10 in an overhung position and projecting laterally, which engage below power-transmission rails 11 of vertical cross bars 5b of the transverse beam 5, which rails are directed at right-angles to the direction of travel of the strip. The rails are attached by means of screws 12 to blocks 13, which are in turn welded to two cross bars 5b located side-by-side.

For adjusting the air gap S, the tie-rods 8 can be shifted axially together and in particular by fork-like adjusting wedges 15, which are located on a slide 16 extending at right-angles to the tie-rods and guided to move on the upper cross member 6. The adjusting wedges 15 engage respectively below a wedge-shaped washer 18 bearing against the nut 17. The slide 16 can be moved by means of a hand-wheel 19, by which the axial adjustment of the tie-rods 8 is effected. Due to the possibility of vertical adjustment of the upper linear motor 1, the size of the air gap S and thus the spacing of the combs of the two linear motors 1 and 2 from the ribbon passing therethrough can be adjusted to the most favourable value irrespective of their depth.

The tie-rods 8 are also parts of the preliminary bending device, since they secure the transverse beam 5 against bending forces directed downwards, by an outer pair of hydraulically operated pressing rods 20. Serving to actuate the pressing rods 20 are hydraulic cylinders 21, which are connected in a flexible manner by swivel pins 22 of a ring 23 to cross bars 6a of the transverse member 6, as shown in FIG. 3. The pressing rods are connected in a rigid manner to connecting members 20a, which are each connected flexibly by a bolt 24 to two cross bars 5b of the transverse beam 5 (FIG. 4).

After the afore-described setting of the air gap S, for setting the strip-withdrawal device illustrated in operation, the hydraulic cylinders 21 receive a certain pressure, which presses the pushing rods 20 downwards, due to which the outer ends of the transverse beam 5 and thus of the linear motor 1 are bent downwards, which in this way obtains a concave contour. During operation, this preliminary bending due to magnetic forces of the travelling-wave of the linear motor 1 should disappear, so that the contour approaches a straight line, which is synonymous with a uniform depth of the air gap S over its entire width.

What is claimed is:

1. A strip withdrawal device for producing back tension in a plurality of metal ribbon strips to be wound comprising:
   (a) at least one travelling wave, electric linear motor means for forming an air gap for the passage of strips to be braked and generating a magnetic field of adequate strength within the air gap to produce eddy currents in the strips which react with the magnetic field to brake the strips;
   (b) said motor means being disposed above and across the width of the air gap; and
   (c) means for bending said motor means so that said motor assumes a concave contour which, seen in the direction of travel of the strips, provides greater spacing from the strips passing through the center of the air gap than at the edges of the air gap; the contour being preset such that, during the operation of said device, the contour approaches a straight line.

2. A device according to claim 1, wherein said bending means is controlled depending upon the consumption of current of said motor means.

3. A device according to claim 1 or 2, further comprising:
   (a) a machine frame for supporting said motor means and having an upper member resistant to bending connected to a lower transverse member;
   (b) a support beam connected to said upper member by said bending means; and
   (c) said motor means being connected over its length and width in a flat and tension-proof manner to said support beam so that said motor means can be subjected to bending.

4. A device according to claim 3, wherein said bending means adjusts the vertical position of said support beam.

5. A device according to claim 4, wherein said bending means comprises:
   (a) a pair of inner axially adjustable tie-rods from which said support beam is suspended from said upper member;
   (b) means for adjusting the axial position of said tie-rod;
   (c) means for connecting said tie-rods to said support beam; and
   (d) a pair of outer hydraulically operated pressing rods having hydraulic cylinders for exerting a pressing force on the outer portions of said support beam.

6. A device according to claim 5, wherein:
   (a) said adjusting means includes wedge-shaped washer bearings connected to each tie-rod by a fastener, and engaging fork-like adjusting wedges located on a slide extending at right-angles to said tie-rods, said wedges being guided to move on said upper member; and
   (b) said connecting means including support rollers connected to and projecting laterally from the lower ends of said tie-rods for engaging said support beam.

7. A device according to claim 5 wherein said cylinders of said pressing rods are pivotally mounted to swing from said upper member.

8. A device according to claim 3, further comprising:
   (a) a lower linear motor means disposed below and across the width of the air gap;
   (b) said lower transverse member of said frame being resistant to bending; and
   (c) said lower linear motor means being connected to said lower transverse member in a flat, tension-proof manner.

9. A device according to claim 8, wherein at least one linear motor means is connected in a flat, tension-proof manner by means of screws to said associated support beam; and
   (b) a shim, which is thinner at its center than at its lateral edges, is located between at least one linear motor and associated support beam to provide a concave contour to said linear motor means under the tension of said screw means.

10. A method for producing back tension in a plurality of metal ribbon strips to be wound, the method comprising the steps of:
(1) forming an air gap with at least one travelling wave electric motor for the passage of strips to be braked, said motor generating a magnetic field of adequate strength to produce eddy currents in the strips which react with the magnetic field to brake the strips; and (2) bending the motor to assume a concave contour which, seen in the direction of travel of the strips, provides greater spacing from the strips passing through the center of the air gap than at the edges of the air gap, presetting the contour so that the contour approaches a straight line during operation.

11. A method as recited in claim 10 further comprising the step of controlling the contour of the motor depending upon the consumption of current of the motor.

* * * * *